United States Patent

[11] 3,620,429

[72] Inventors Isao Kozu; Yuikitada Ayukawa, both of Osaka, Japan
[21] Appl. No. 25,529
[22] Filed Apr. 3, 1970
[45] Patented Nov. 16, 1971
[73] Assignee Matsushita Electric Industrial Co., Ltd. Kadoma, Osaka, Japan
[32] Priorities Apr. 8, 1969
[33] Japan
[31] 44/28515;
Apr. 9, 1969, Japan, No. 44/28430; Apr. 7, 1969, Japan, No. 44/28467

[54] DEVICE FOR DETECTING A TAPE END IN A TAPE RECORDER
5 Claims, 8 Drawing Figs.

[52] U.S. Cl. .......... 226/11, 242/186, 274/4 C, 274/4 D
[51] Int. Cl. .......... B65h 25/32
[50] Field of Search .......... 226/11, 43, 174, 179; 242/186, 188

[56] References Cited

UNITED STATES PATENTS

| | | | |
|---|---|---|---|
| 3,432,169 | 3/1969 | Schroder | 274/4 B |
| 3,485,500 | 12/1969 | Loeschner et al. | 274/4 B X |

*Primary Examiner*—Richard A. Schacher
*Assistant Examiner*—Gene A. Church
*Attorney*—Wenderoth, Lind & Ponack

ABSTRACT: A device to detect the arrival of a tape end when movement of the tape is terminated includes a capstan driven by a motor. A pressure roller is rotatably mounted on an arm to move a tape by means of cooperation with the capstan. A rotating member is rotatably mounted on the arm coaxially with the pressure roller and is driven by the capstan. An actuating element is mounted fixedly on the rotating member, and a driven means is engageable with the actuating element upon the termination of the movement of the tape.

INVENTORS
ISAO KOZU
YUKITADA AYUKAWA

BY Wenderoth, Lind & Ponack
ATTORNEYS

INVENTORS
ISAO KOZU
YUKITADA AYUKAWA

BY Wenderoth, Lind & Ponack
ATTORNEYS

INVENTORS
ISAO KOZU
YUKITADA AYUKAWA

BY Wenderoth, Lind & Ponack
ATTORNEYS

DEVICE FOR DETECTING A TAPE END IN A TAPE RECORDER

The present invention relates to a tape recorder and more particularly to a tape recorder capable of detecting the termination of movement of a tape.

In conventional tape recorders, various attempts have been made to detect the termination of movement of a tape. For example, some of the commercially available tape recorders are provided with a shutoff switch which is adapted to be actuated when the tape moves away from a predetermined tape path. Others are provided with a sensing switch for detecting the presence of a metal foil which is adhered to the end portion of the tape. In the above arrangements a solenoid must be used in order to bring the tape recorder to a completely stopped condition.

Recently new reel-to-reel type cartridges, the so-called cassettes, have become popular all over the world. An improved method has been proposed for the purpose of detecting the termination of the tape movement which method is particularly useful in a cassette tape recorder. It employs a throw-detecting switch which is responsive to the rotation of a reel roller. In a cassette tape recorder, the reel rollers stop their rotation when the tape reaches the end of its movement because both ends of the tape are permanently affixed to reel hubs in the cassette. At the termination of rotation of the reel rollers, said detecting switch acts to energize a solenoid which acts to stop the tape recorder.

Such detecting devices as those described above have a comparatively high manufacturing cost because of the necessity of providing a solenoid which is more expensive than other mechanical components used in the tape recorder. In order to avoid using such an expensive solenoid, some tape recorders are provided with a tape end detecting device which functions to cut off the power supply for a motor and an amplifier. In this case, however, the tape-driving mechanism remains in its position of operation for a long time if the operator forgets to return the controls of the tape recorder to the stopped condition. Therefore, a pressure roller in such a tape recorder will remain pressed in engagement with a capstan for a long period after the tape recorder terminates its operation. Consequently, the pressure roller will be given a permanent deformation at a portion of the periphery, which may cause an increase in wow and flutter when the pressure roller is again used to drive a tape.

Accordingly, an object of the present invention is to provide an improved tape recorder having a novel detecting device for mechanically detecting the termination of the movement of a tape.

Another object of the present invention is to provide an improved tape recorder having a novel-detecting device for mechanically detecting the termination of movement of a tape so as to initiate the tape recorder and the controls therefor to automatically return to the stopped condition.

Still another object of the present invention is to provide an improved tape recorder having a novel detecting device which is inexpensive to manufacture and reliable in its operation for mechanically detecting the termination of movement of a tape.

A still further object of the present invention is to provide a tape recorder as described in the preceding paragraph with a novel device for protecting the tape recorder against an increase of wow and flutter upon further operation.

These objects are achieved by the tape recorder according to the present invention, which includes a capstan driven by a motor, a pressure roller for moving the tape by means of cooperation with said capstan, a rotating member which is coaxially combined with said pressure roller and is driven by said capstan, an actuating element mounted fixedly on said rotating member, and driven means engageable with said actuating element upon the termination of movement of the tape.

Further objects and advantages of the invention will become apparent from the following detailed description taken in connection with the accompanying drawings in which.

FIG. 5a, 5b, 5c, and 5d are fragmentary plan views of the detecting device for detecting the termination of movement of the tape.

Figure 1:
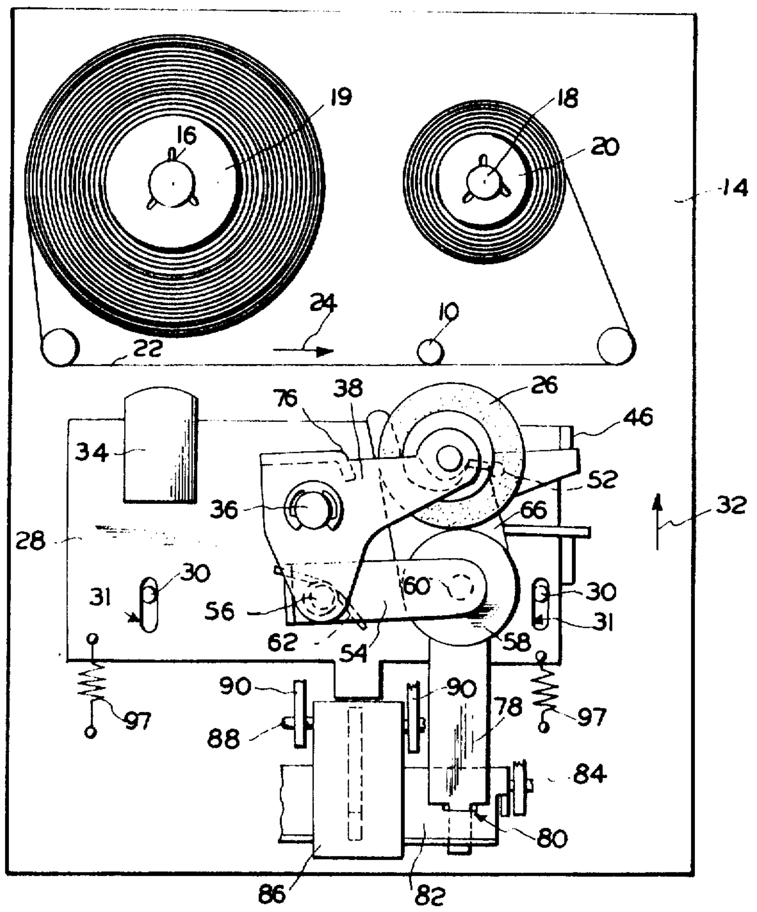
FIG. 1 is a schematic plan view of a tape recorder having the novel detecting device according to the present invention.
Figure 3:
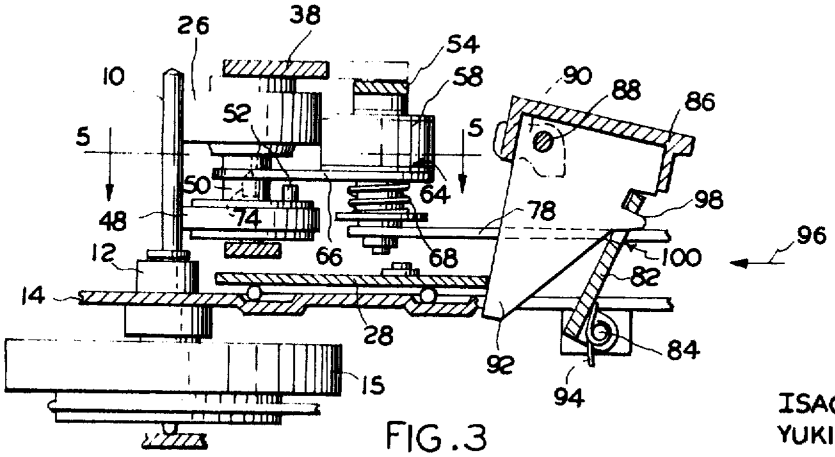
FIG. 3 is a sectional view of the tape recorder taken substantially along the line 3—3 of FIG. 2.

Referring now to the drawings, particularly to FIGS. 1 and 3, a capstan 10 is rotatably mounted on a bearing 12 which is secured on a chassis 14. The capstan 10 is provided with a flywheel 15 and is rotated counterclockwise as viewed in FIG. 1 by a suitable electric motor (not shown). A supply reel roller 16 and a takeup reel roller 18 are rotatably mounted on the chassis 14. A pair of rotatable hubs 19 and 20 in a cartridge (not shown) can be engaged with said reel rollers 16 and 18, respectively, when the cartridge is inserted into the tape recorder. The two ends of a magnetic tape 22 are permanently affixed to respective hubs 19 and 20. The tape 22 can be moved in the direction of arrow 24 by said capstan 10 and a pressure roller 26. Their detailed construction will be explained later. Since the takeup reel roller 18 is constructed and operated in a manner well known in the art, it will rotate the takeup hub 20 to wind the tape 22 on said hub 20 according to the above movement of the tape 22. A sliding plate 28 is attached to the chassis 14 and is guided by guide pins 30 which are inserted into elongated slots 31 in the sliding plate 28 to allow the sliding plate to slide in the direction of arrow 32. A magnetic head 34 is mounted on the plate 28. Further, pressure roller 26 and the main parts of the detecting device of the present invention are also mounted on the plate 28.

Figure 4:
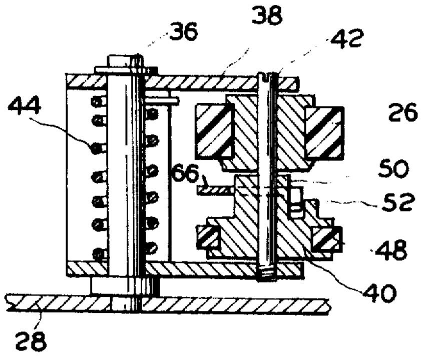
FIG. 4 is a fragmentary sectional view of the tape recorder taken along the line 4—4 of FIG. 2.

With particular reference to FIG. 4, sliding plate 28 has a shaft 36 secured thereto and extending upwardly therefrom. An arm 38 is rotatably mounted on shaft 36. Pressure roller 26 and a rotating member 40 are mounted on a shaft 42 which is attached to arm 38 so as to independently rotate. Arm 38 is biased by a torsion spring 44 which is inserted around shaft 36 to rotate counterclockwise (in FIG. 1) about the shaft 36. This rotation, however, is restricted by the contact of an end of arm 38 with a tab 46 extending upwardly from sliding plate 28 when the tape recorder is in its stopped condition as shown in FIG. 1. Pressure roller 26 and rotating member 40 are pressed against the capstan 10 by the action of spring 44 when the tape recorder is brought to its playing condition, as will be explained in more detail later. Rotating member 40 has a rubber tire 48 at a periphery thereof in order to sufficiently transmit the driving force from the capstan 10 to rotating member 40. To achieve this result, the rubber-tired rotating member 40 of this embodiment could be replaced by a gear, and a pinion could permanently be affixed to capstan 10 to engage said gear.

Figure 5A:
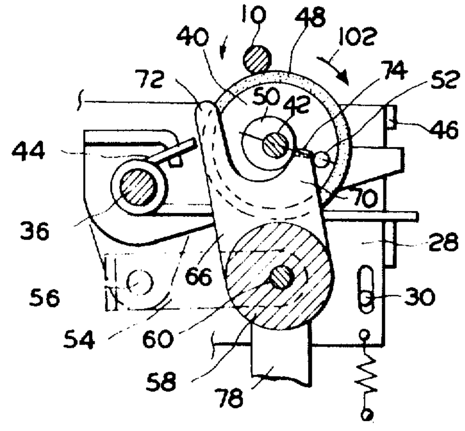

As shown in FIGS. 4 and 5a, the rotating member 40 is provided with a driving element 50 which is an eccentric cam formed integrally with rotating member 40. Rotating member 40 is equipped with an actuating element 52 which rotates synchronously with the driving element 50. The relationship between the positions of driving element 50 and actuating element 52 is as follows: the actuating element 52 is positioned at the opposite side of the maximum radius point of the diving element 50 and also substantially in a straight line connecting this point and the center of rotating member 40. A gap provided between the driving element 50 and the actuating element 52 is large enough to allow a portion of a driven means to pass therethrough, said driven means to be explained hereinafter.

With reference to FIGS. 1, 3 and 5a, one end of an arm 54 is rotatably mounted on a shaft 56 which is secured to one end of arm 38. A friction roller 58 is rotatably mounted on a shaft 60 which is secured to the other end of arm 54. The periphery of friction roller 58 is pressed against the pressure roller 26 by means of a torsion spring 62 which biases arm 54 counterclockwise as viewed in FIG. 1. A felt ring 64 is adhered to the lower surface of friction roller 58. A follower member 66 is rotatably mounted on shaft 60 and is pressed upwardly against the felt ring 64 by a compression spring 68. With particular reference to FIG. 5*a*, follower member 66 has two projection arms 70 and 72 with driving element 50 positioned therebetween. The projection arm 70 has a tab 74 extending downwardly from the edge portion thereof. Tab 74 is pressed against the periphery of the driving element 50 as pressure roller 26 rotates clockwise. The purpose of this arrangement will become apparent later in the description of the operation of the tape recorder. Projection arm 72 restricts rotation of the follower member 66 within a predetermined stroke. This is due to the fact that the follower member 66 can not swing clockwise when the projection arm 72 contacts the driving element 50 and it can not swing counterclockwise when arm 72 contacts a stopper 76 which projects from the arm 38.

Referring now to FIG. 1 and FIG. 3, one end of a connecting bar 78 is pivotally connected to the lower portion of shaft 60. The other end of the bar 78 is inserted into a slot 80 of a latch plate 82 which is pivotally mounted on a shaft 84 which is horizontally mounted on the chassis 14. A pushbutton 86 is pivotally mounted on a horizontal shaft 88 which is supported by brackets 90 mounted on the chassis 14. Pushbutton 86 has an operating plate 92 which can be latched by said latch plate 82 under the biasing force of a torsion spring 94 mounted on the shaft 84.

Figure 2:
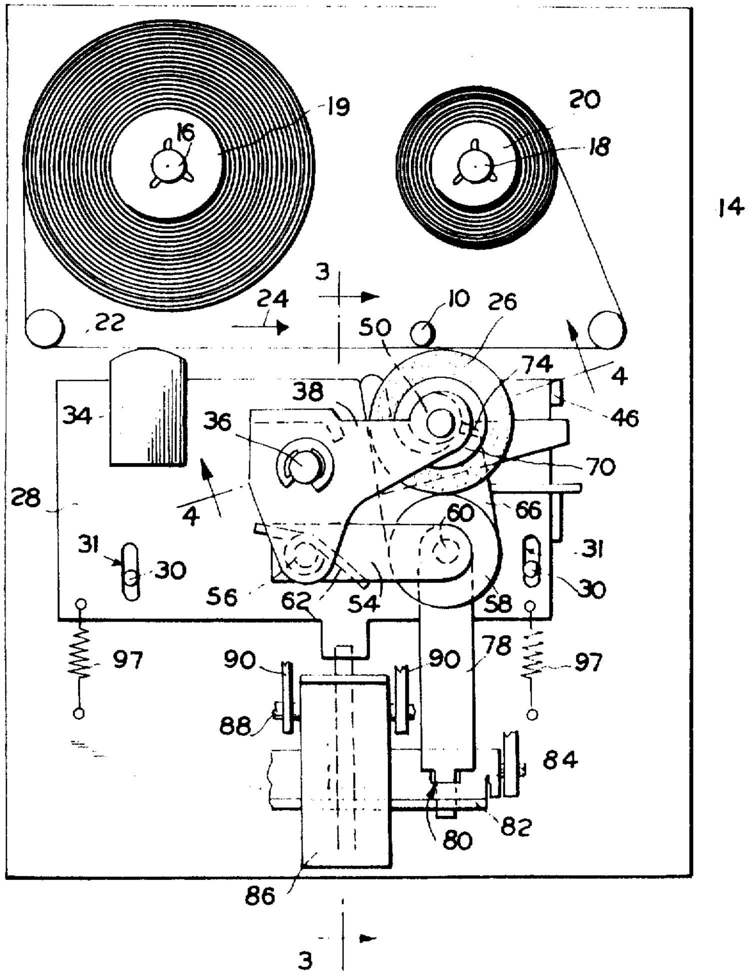
FIG. 2 is a schematic plan view of the tape recorder similar to FIG. 1, but with the parts in the playing condition.

If an operator depresses the pushbutton 86, a lower end of the operating plate 92 drives the sliding plate 28 in the direction of arrow 96 against the biasing force of springs 97 which are connected to said plate 28, and a lip portion 98 of said operating plate 92 is latched by a catch 100 of the latch plate 82 as shown in FIG. 3. In response to the above-described sliding movement of the plate 28, the pressure roller 26 and the rotating member 40 are pressed against the capstan 10, and the magnetic head 34 is engaged with the tape 22 as shown in FIG. 2. The capstan 10 and the pressure roller 26 cooperate to move the tape 22 in the direction of arrow 24 from the supply hub 19 to the takeup hub 20. The tape 22 can be recorded or reproduced through the head 34.

At the same time, the friction roller 58 and the follower member 66 move to their first positions as shown in FIG. 2. The pressure roller 26 rotates the friction roller 58 counterclockwise so that the follower member 66 is driven counterclockwise by the frictional rotation force delivered from the felt ring 64. Therefore, the tab 74 of the projection arm 70 is pressed against the periphery of the driving element 50. As rotating member 40 rotates in the direction of arrow 102 in FIG. 5*a*, the driving element 50 drives the tab 74 to impart oscillating motion to the follower member 66. Tab 74 is not contracted by the actuating element 52, because the gap between the driving element 50 and the actuating element 52 is large enough to allow tab 74 to pass therethrough, as previously set forth.

Movement of tape 22 stops when the entire tape roll is unwound from the supply hub 19, since the tape end is permanently affixed to hub 19.

Since the pressure roller 26 has a width substantially equal to the width of the tape 22, the pressure roller 26 is primarily driven by tape 22. Accordingly, pressure roller 26 stops its rotation upon termination of movement of the tape, while the capstan 10 continues rotating as a result of slip between the capstan 10 and the tape 22, and rotating member 40 also continues to rotate due to its contact with capstan 10. At the same time, friction roller 58 stops rotating whereby the follower member 66 can not swing counterclockwise.

Figure 5B:
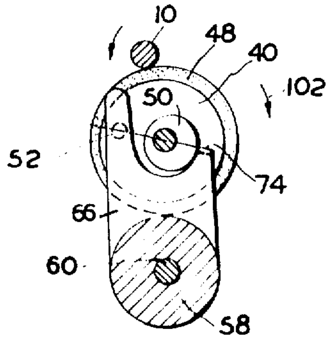
Figure 5C:
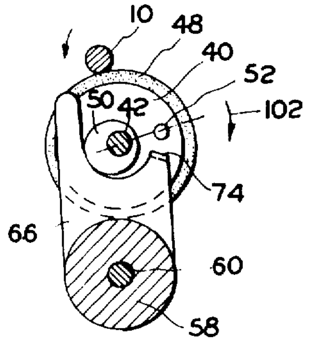
Figure 5D:
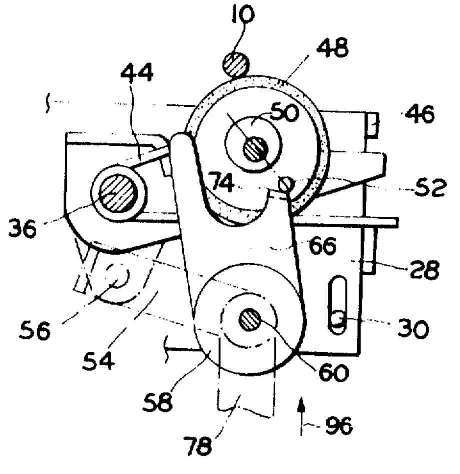

Suppose, for example, the follower member 66 occupies the position shown in FIG. 5*a* when the pressure roller 26 stops its rotation upon the termination of movement of the tape. The follower member 66 is driven by the driving element 50 and is rotated to its clockwise extremity as shown in FIG. 5*b*. Follower member 66 stop its motion at this point since the friction roller 58 no longer operates to swing back the follower member 66. As rotating member 40 rotates in the direction of arrow 102, the tab 74 is isolated from the periphery of the driving element 50 as shown in FIG. 5*c*. When the rotating member 40 further rotates in the direction of arrow 102, the actuating element 52 strikes the tab 74 as shown in FIG. 5*d*. This causes the follower member 66 and the friction roller 58 to displace from their first position to their second position as seen in FIG. 5*d*, and further causes the arm 54 to rotate clockwise about the shaft 56. Therefore, the connecting bar 78 is moved in a direction opposite to that of arrow 96 to unlatch the pushbutton 86 from the latch plate 82. The sliding plate 28 is returned to its original position by the springs 97 as shown in FIG. 1, and the pressure roller 26 is withdrawn from the capstan 10 by tab 46 and returns to its stop position. At the same time the magnetic head 34 is displaced from the tape 22. It will be readily understood that above-mentioned operation will be achieved whatever the position of the pressure roller 26 when it stops.

The rotating member 40 has sufficient power to drive the follower member 66 to return the tape recorder to its stopped condition, because the rotating speed of the rotating member 40 is designed to be lower than that of the capstan 10, and also because flywheel 15 has a relatively high inertia.

If desired, one can easily modify the device to provide a switch whereby electric power to the motor can be automatically shut off in accordance with above-described return motion of the sliding plate 28 or of the pushbutton 86.

According to the embodiment described above, the tape recorder is brought to its stopped condition, that is, the pushbutton 86, the pressure roller 26 and the magnetic head 34 are returned to their stop positions, when movement of the tape is terminated. A modification may be easily achieved wherein the actuating element intermittently contacts the follower member to sound an alarm to inform the operator of the termination of tape movement. In addition, the tape end detecting device of the present invention may be effectively applied to a bidirectional tape recorder wherein driven means driven by the actuating element may initiate automatic tape-reversing mechanisms so as to change the direction of tape movement.

It is apparent that various modifications may be made without departing from the invention. The above-described specific examples are intended merely to illustrate the various facets in certain selective embodiments of the invention.

What is claimed is:

1. In a tape recorder, the combination comprising: a driven capstan, a pressure roller rotatably mounted on an arm and adapted to engage with said capstan to move a tape, a rotating member rotatably mounted on said arm coaxially with said pressure roller and driven by said capstan, an actuating element fixedly mounted on said rotating member, and driven means adapted to engage said actuating element upon the termination of movement of said tape.

2. The combination defined in claim 1, wherein said driven means is adapted to release said pressure roller from engagement with said capstan by means of the rotation force of said rotating member when movement of said tape is terminated.

3. In a tape recorder, the combination comprising: a driven capstan, a pressure roller rotatably mounted on an arm and adapted to engage with said capstan to move a tape, a rotating member rotatably mounted on said arm coaxially with said pressure roller, a driving element mounted fixedly on said rotating member, an actuating element fixedly mounted on said rotating member rotatable in synchronism with said driving element, and a follower member biased against said driving element under the rotation force of said pressure roller so as to follow said driving element, said follower element remaining out of engagement with said actuating element while said pressure roller continues its rotation, and said actuating means engaging said follower member when said pressure roller stops its rotation upon the termination of movement of said tape.

4. The combination defined in claim 3, wherein said follower member is biased against said driving element by the frictional rotation force of a friction roller which is associated with and rotated by said pressure roller.

5. The combination defined in claim 3, wherein said follower member is movable from a first position to a second position by said actuating element when said pressure roller stops its rotation upon the termination of movement of said tape, said follower member at said first position follows said driving element and at said second position being adapted to move said pressure roller out of engagement with said capstan.

* * * * *